US010739955B2

(12) United States Patent
Wang et al.

(10) Patent No.: US 10,739,955 B2
(45) Date of Patent: Aug. 11, 2020

(54) SYSTEM AND METHOD FOR ADAPTIVE DATA VISUALIZATION

(71) Applicant: ROYAL BANK OF CANADA, Montreal (CA)

(72) Inventors: Luyu Wang, Toronto (CA); Yanshuai Cao, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 85 days.

(21) Appl. No.: 15/974,032

(22) Filed: May 8, 2018

(65) Prior Publication Data

US 2018/0356949 A1     Dec. 13, 2018

Related U.S. Application Data

(60) Provisional application No. 62/518,386, filed on Jun. 12, 2017.

(51) Int. Cl.

| G06F 3/0484 | (2013.01) |
| G06T 11/20 | (2006.01) |
| G06F 3/0482 | (2013.01) |
| G06N 7/00 | (2006.01) |
| G06N 20/00 | (2019.01) |

(52) U.S. Cl.
CPC .......... *G06F 3/0484* (2013.01); *G06F 3/0482* (2013.01); *G06N 7/005* (2013.01); *G06N 20/00* (2019.01); *G06T 11/206* (2013.01)

(58) Field of Classification Search
CPC ...... G06N 7/005; G06N 20/00; G06T 11/206; G06F 3/0484; G06F 3/0482
See application file for complete search history.

(56) References Cited

U.S. PATENT DOCUMENTS

| 6,990,238 | B1 * | 1/2006 | Saffer | ................. G06K 9/6218 382/224 |
| 7,071,940 | B2 | 7/2006 | Malik | |
| 9,990,687 | B1 * | 6/2018 | Kaufhold | ............. G06N 3/0454 |
| 10,289,283 | B1 * | 5/2019 | Cao | ...................... G06T 11/206 |
| 2014/0336942 | A1 * | 11/2014 | Pe'er | ..................... G16B 40/00 702/19 |
| 2014/0344193 | A1 | 11/2014 | Bilenko et al. | |
| 2017/0098318 | A1 | 4/2017 | Iannaccone et al. | |
| 2018/0018386 | A1 * | 1/2018 | Orlova | .................. G06F 3/0482 |
| 2019/0050713 | A1 * | 2/2019 | Narihira | ................ G06F 16/367 |

OTHER PUBLICATIONS

International Search Report and Written Opinion issued in International Patent Application No. PCT/CA2018/050545, dated Jul. 16, 2018.

(Continued)

*Primary Examiner* — Tadesse Hailu
(74) *Attorney, Agent, or Firm* — Norton Rose Fulbright Canada LLP; Maya Medeiros

(57) ABSTRACT

An interactive data visualization system is provided that utilizes unsupervised learning process, to automatically choose the hyperparameters for generating insights, which are then used for visualizing the data using interactive plots that update dynamically in response to input control commands.

20 Claims, 8 Drawing Sheets

(56) References Cited

OTHER PUBLICATIONS

Snoek, J. et al., "Practical Bayesian Optimization of Machine Learning Algorithms", NIPS'12 Proceedings of the 25th International Conference on Neural Information Processing Systems, v. 2, p. 2951-2959, Dec. 3, 2016.

Kotthoff, L. et al., "Auto-WEKA 2.0: Automatic Model Selection and Hyperparameter Optimization in WEKA", Journal of Machine Learning Research 17, p. 1-5, Nov. 2016.

Bergstra, J. et al., "Algorithms for Hyper-parameter Optimization" NIPS'11 Proceedings of the 24th International Conference on Neural Information Processing Systems, p. 2546-2554, Dec. 12-15, 2011.

Brochu, E et al., "A Tutorial on Bayesian Optimization of Expensive Cost Functions, with Applications to Active User Modeling and Hierarchical Reinforcement Learning", arXiv Preprint arXiv: 1012.2599, 2010.

Brochu, E et al., "Active Preference Learning with Discrete Choice Data", Advances in Neural Information Processing Systems, p. 409-416, 2008.

Van Der Maaten et al., "Visualizing Data Using T-sne", Journal of Machine Learning Research, p. 2579-2605, Nov. 9, 2008.

Rissanen, J., "Modeling by Shortest Data Description", Automatica, vol. 14(5), p. 465-471, 1978.

Schwartz, G., "Estimating the Dimension of a Model", The Annals of Statistics, vol. 6(2), p. 461-464, 1978.

\* cited by examiner

SYSTEM AND METHOD FOR ADAPTIVE DATA VISUALIZATION

FIELD

The present disclosure generally relates to the field of data visualization, and more particularly, to data visualization having regard to hyperparameter selection.

INTRODUCTION

Data visualization is an informative step in the process of data analytics and business intelligence that presents the high-dimensional data in a human-understandable way.

Data visualization can lead to the discovery of novel hidden patterns within the data that may not be understandable or discoverable in the visualization of underlying raw data.

Data visualization can automatically generate visual elements for an interface by identifying the patterns in raw data sets.

SUMMARY

In accordance with an aspect, there is provided a data visualization system for generating one or more visualizations indicative of chaining of union or intersect of selections. The data visualization system involves a processor configured to process machine readable instructions to: receive user files; process the user files by applying an automatic hyperparameter selection; generate interactive plots using the processed user files, the interactive plots indicative of chaining of union or intersect of selections; store the interactive plots; generate an interface with visual elements indicating the interactive plots, the interface having selectable indicia configured to be responsive to input to select a data point or subset of data points of the interactive plots; responsive to the selectable indicia, generate updated interactive plots based on the selected data point or subset of data points; store the updated interactive plots; update the interface with additional visual elements indicating the updated interactive plots; and a user interface component configured to display the interface with the visual elements indicating the interactive plots and the additional visual elements indicating the updated interactive plots. In some embodiments, the processor is configured to process the user files using a pseudo Bayesian Information criterion for the automatic hyperparameter selection.

In some embodiments, the pseudo Bayesian information criterion is applied to automatically generate a best perplexity.

In some embodiments, the pseudo Bayesian Information criterion is computed using: where p is the perplexity, N is a number of data points of the user files, and kl_div(p) is a Kullback-Leibler divergence of t-SNE with perplexity p on the user files.

In some embodiments, the processor is configured to implement machine learning to compute t-SNE with different perplexities to select the best perplexity.

In some embodiments, the selectable indicia has a slider to select a value for a perplexity for the pseudo Bayesian Information criterion to update the interactive plots.

In some embodiments, the processor is configured to implement an unsupervised learning process for the automatic hyperparameter selection.

In some embodiments, the processor is configured to process the user files by applying the automatic hyperparameter selection to reduce the dimensionality of the user files for generation of the interactive plot.

In some embodiments, the user files are high dimensional data and the interactive plots are two dimensional data or three dimensional data, the processor being configured to the process the user files by applying the automatic hyperparameter selection to reduce the dimensionality of the user files from the high dimensional data to the two dimensional data or the three dimensional data.

In some embodiments, the interactive plots represent scatter plots linked to histograms of an original dimension of the user files to show a comparison between distributions of selected data point or the subset of data points.

In some embodiments, the data point represents an outlier data point or the subset of data points represents a cluster.

In some embodiments, the interface has the selectable indicia configured to be responsive to input to trigger an operation for chaining of union or intersect selections of the selected data point or the subset of data points.

In some embodiments, the processor is configured to process the user files to reduce the dimensionality of the user files for generation of the interactive plots using dimensionality reduction processes PCA, ICA and t-SNE, the interactive plots comprising reduction results from the dimensionality reduction processes.

In some embodiments, the interactive plots have a first scatter plot for the dimensionality reduction process PCA, a second scatter plot for the dimensionality reduction process ICA, and third scatter plot for the dimensionality reduction process t-SNE, and a plurality of histograms showing distributions for the dimensionality reduction processes.

In some embodiments, the processor is configured to store received input in a data storage as past selections for use in generating a union or intersect.

In some embodiments, the selected data point or the subset of data points is from a first interactive plot which triggers generation of an automatic update of visual elements for other interactive plots at the interface.

In some embodiments, the selectable indicia are logical anchor points of the visual elements that are indicative of an interactive ability to control visualization and the interface.

In some embodiments, the processor is configured to preprocess the user files to correct missing values, set appropriate types, and compute descriptive data.

In accordance with an aspect, there is provided a data visualization process for generating one or more visualizations indicative of chaining of union or intersect of selections. The process involves: at a processor, receiving user files; processing the user files by applying using a pseudo Bayesian Information criterion for automatic hyperparameter selection, wherein the pseudo Bayesian information criterion is applied to automatically generate an optimal perplexity; generating interactive plots using the processed user files, the interactive plots indicative of chaining of union or intersect of selections; storing the interactive plots; generating an interface with visual elements indicating the interactive plots, the interface having selectable indicia configured to be responsive to input to select a data point or subset of data points of the interactive plots; responsive to the selectable indicia, generating updated interactive plots based on the selected data point or subset of data points; storing the updated interactive plots; updating the interface with additional visual elements indicating the updated interactive plots; and at an a user interface component, displaying the interface with the visual elements indicating the interactive plots and dynamically updating the interface the additional visual elements indicating the updated interactive plots.

In accordance with an aspect, there is provided a computer readable medium storing machine executable instructions to configure a processor for generating one or more visualizations indicative of chaining of union or intersect of selections by: receiving user files; processing the user files by applying using a pseudo Bayesian Information criterion for automatic hyperparameter selection, wherein the pseudo Bayesian information criterion is applied to automatically generate an optimal perplexity; generating interactive plots using the processed user files, the interactive plots indicative of chaining of union or intersect of selections; storing the interactive plots; generating an interface with visual elements indicating the interactive plots, the interface having selectable indicia configured to be responsive to input to select a data point or subset of data points of the interactive plots; responsive to the selectable indicia, generating updated interactive plots based on the selected data point or subset of data points; storing the updated interactive plots; updating the interface with additional visual elements indicating the updated interactive plots; and controlling the display of the interface, at a display device, with the visual elements indicating the interactive plots and dynamically updating the interface the additional visual elements indicating the updated interactive plots.

In accordance with an aspect, there is provided a data visualization system for generating one or more visualizations indicative of chaining of union/intersect of selections, the data visualization system comprising: a flask server configured for receiving user files; and a visualization server configured to process the user files to generate interactive plots by applying pseudo Bayesian Information criterion for automatic hyperparameter selection; and a graphical user interface component configured to generate the one or more visualizations based on the interactive plots received from the Bokeh server.

In some embodiments, the pseudo Bayesian information criterion is applied to generate the best perplexity automatically without any human prior.

In various further aspects, embodiments provide corresponding systems and devices, and logic structures such as machine-executable coded instruction sets for implementing systems, devices, and methods described herein.

In this respect, before explaining at least one embodiment in detail, it is to be understood that the embodiments are not limited in application to the details of construction and to the arrangements of the components set forth in the following description or illustrated in the drawings.

Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
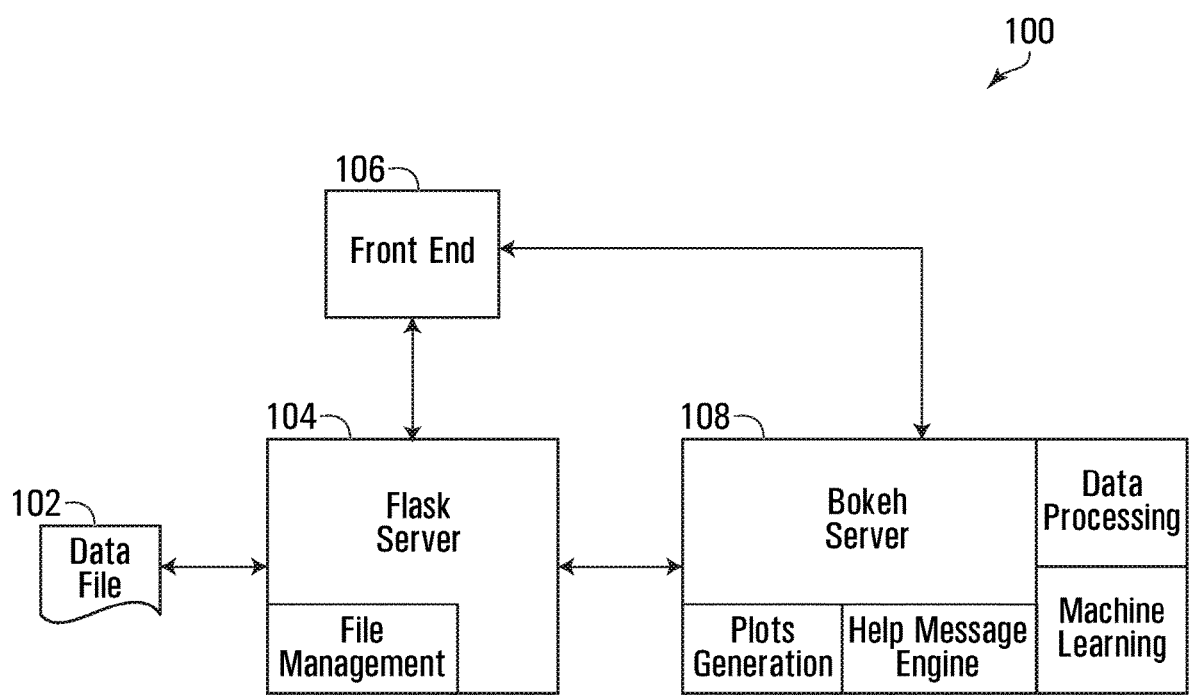
FIG. 1 an example system architecture diagram, according to some embodiments.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Systems and methods are described in some embodiments to provide useful tools adapted to visualize and interact with characteristics and relationships of large data sets that would be impractical or impossible to see through normal plotting. The visualizations and interactions are designed to promote the revealing of previously unknowable interrelationships between data sets, which may emerge under different hyperparameter selection conditions.

In various embodiments, innovative methods and processes for automatic hyperparameter selection (e.g. without human input) is described, and corresponding hyperparameter selection methodologies and specially configured systems.

Several data visualization software systems are available, developed by Tableau™, Palantir™, Airbnb™, etc. These systems are usually in the form of web services, and they are interactive in the sense that the user can easily change the view of the data presented form the front-end in read-time. Nevertheless, even though they tend to be easy-to-use and versatile, they only provide basic statistics about the data. They lack the capability to leverage the power of machine learning processes.

Unsupervised machine learning processes, including dimensionality reduction methods, can be used for visualizing high-dimensional data while pertaining the intrinsic structures and patterns. Nevertheless, nonlinear dimensionality reduction algorithms, namely, t-Distributed Stochastic Neighbour Embedding (t-SNE), can depend on many hyperparameters to obtain results whose quality is hard to quantify, and therefore manual inspection may be required. This usually results in a very time-consuming process. Embodiments described herein enable automatic hyper-parameters selection for data processing.

An interactive data visualization system implementing unsupervised learning processes which automatically choose the hyperparameters for the user is provided according to some embodiments. The system is adapted for generating insights, when visualizing the data by interface generation, to provide the most informative results while providing interfaces and processes that have an ease of use and may be entertaining (e.g., fun) for a user. To address the problem of visualization hyperparameter selection, an innovative approach to automatically choose the best hyperparameter without user involvement is provided, in some embodiments. A system is directed to embed an efficient interactive data visualization procedure into the practical day-to-day workflow of data scientists and quantitative analysts across different departments of an organization.

Traditionally, data analytics are done with the analyst's experience and prior knowledge. Given the data, the analyst usually comes up with the hypothesis first, and then the analyst writes programs or SQL scripts accordingly to query the database, to validate their hypothesis. This paradigm is limited by human imagination. With the emerging field of data science, the importance of data visualization is growing as it makes it possible to better understand the raw data with improved and automatic generation of visual elements for an interface.

Data visualization allows for a joint effort of machine learning and human intuition to find valuable and useful patterns within the data, and then generate hypothesis from the patterns. Data visualization systems can allow that the user can easily select what aspects and which portion of the data to view and update the interface dynamically in response these input control commands. Embodiments can use unsupervised machine learning processes, in particular dimensionality reduction processes, embedded within the visualization tools.

Dimensionality reduction algorithms project the originally very high-dimensional data into two or three dimensions, which can be perceived by human visually. This projection can be at a price of losing information from the original space, especially for linear dimensionality algorithms including principle component analysis (PCA) and independent component analysis (ICA).

The t-distributed stochastic neighbour embedding (t-SNE) method is such a nonlinear approach that pertains the local structure in the high-dimensional space. The approach is nonlinear and adapts to the underlying data, performing different transformations on different regions. Thus, the approach can faithfully keep the interesting structures and patterns visible in the low-dimensional embeddings. This approach cam have a hyperparameter identified as "perplexity", which describes (loosely) the trade-off between how much local and how much global information to keep during the projection. The perplexity value has a complex effect on the resulting pictures.

For example, the performance of t-SNE can be fairly robust to changes in the perplexity, and typical values are between 5 and 50 in some examples. But this is more nuanced than described. The quality of the simulation might be hard to quantify and might only be told when a user sees the result. Getting the most from t-SNE may mean manually analyzing multiple plots with different perplexities. One usually chooses factors by experience and with luck after a few trials it will show a good result. Accordingly, the hyperparameter selection process is typically very time- and mind-consuming. Embodiments described herein provide an improved hyperparameter selection process.

Therefore, an easy-to-use interactive data visualization system with dimensionality reduction capability can be useful in various applications by data analysts and scientists.

The data visualization system allows data analysts and scientists to perform better in pattern discovery and hypothesis generation to create business values form the data. In an embodiment, the system reduces the original high-dimensional data into two or three, and presents the results in scatter plots to the users; users can then drill down to inspect and find more information about a specific point (e.g., an outlier) or a subset (e.g., a cluster). The data visualization system, in an embodiment, is configured to provide all results on the scatter plots with one click, as well as generate real-time guidance for non-experts in the form of help messages. The plots can, for example, be linked to the histograms of the original dimensions showing the comparisons between the empirical distributions of selected data points versus all.

A user may, through one or more generated interactive graphical elements, then interact with the results by looking at different aspects and subsets of the original data using complex operations including chaining of union/intersect selections with irregular boxes on different scatter plots, which is difficult and/or impossible using traditional tools such as SQL queries. Meanwhile, to reduce the burden associated with tuning hyperparameters, the data visualization system is configured to automatically select one or more optimal parameters (e.g., the best parameter) for the hyperparameter selection. Accordingly, the system allows the user to discover the hidden patterns within the data.

In some embodiments, a web-based interactive data visualization software system is provided that is configured to facilitate the efficient discovery of the hidden patterns within the data, providing ease of use (e.g., some embodiments are adapted for loading and visualizing the data with one click). Various three dimensionality reduction methods, namely PCA, ICA, and t-SNE, may be configured for automatic operation, and the reduction results will be shown on scatter plots, whereas the histograms of the distribution of each original column from the input data are also provided. All plots will be interactive and linked, meaning one can select a subset of data from either plot, and the selected data will also be highlighted on all other plots. Help messages may be generated in real or near real time (e.g., on the fly) to guide users in using the system. Interfaces and processing units may be configured to support union and intersect of multiple shots of selections. The selected subset can be outputted and load again for the finer-grain analysis. The system may then select the best hyperparameter for t-SNE automatically.

FIG. 1 is an example system architecture diagram 100, according to some embodiments.

In a practical example implementation, in order to make such a web-based interactive data visualization system that leverage the power of machine learning algorithms possible, the system may be built on Python in some examples. Other programming languages are possible. A data file 102 is received which may be referred to as a user file.

The backend has a Flask server 104 configured for managing files, and a Bokeh server 108 configured for computations, plots generation, help message generation, and machine learning. The Flask server is an example framework (i.e., a Python-based micro-framework), and other types of frameworks can be utilized for receiving and/or maintaining data sets (e.g., including relational mappers and/or other extensions). The Bokeh server is an example of a visualization server, and other types of visualization mechanisms can be utilized instead of a Bokeh server. These servers can be implemented using one or more computing systems that include processors, computer-readable memory (e.g., random access memory, read only memory), storage media, among others, and the files can be obtained through various communication interfaces, such as interfaces that communicate through the Internet, intranets, point to point communications, among others.

A front end 106 (e.g. an interface application to render an interface on display device) is provided that may include one or more graphical user interface generation mechanisms that receive as inputs requests for and data sets representing visualizations, and generates corresponding interactive and interface-able user interface elements. For example, in visualizing data, it may be desirable that data is not only shown, but can be modified using selectable indicia at the interface such that different views are possible and dynamically generated in response to activation of the selectable indicia. Accordingly, the front end 106 may be configured to establish logical anchor points (e.g. selectable indicia) where visual elements may be deposited that are indicative of an ability for a user to be able to interact with the visualization itself, modifying how the visualization effects are provided, among others. As an example, the front end 106 may instantiate/cause the rendering of handles or widgets/widget bars for modifying hyperparameter selection, filtering information, augmenting information shown, causing rotations, inversions, changes in perspective, toggling features (e.g., wireframe view), among others. Further, additional dimensions (e.g., >4) may be processed to be renderable in 2 or 3 dimensions (e.g., by selectively removing dimensions) and provided. Visualizations need not be restricted to traditional coordinate units, and various aspects may be assigned to different types of coordinate units so that different visualizations are possible (for example, 3-D space can be represented in any type of shape, not just Cartesian coordinates, and it may be useful to visualize information in the form of cylindrical coordinates, spherical coordinates, or any coordinate system that is possible). Non-Euclidean and manifold spaces are possible, and these different visualizations may be available for rendering to the user.

Front end 106 may be configured to assign different variables (or newly generated variables formed of a composite of other variables) to different types of interface elements (e.g. selectable indicia), and for example, voxels may be generated that are representative of different types of information, the voxels for rendering on a user interface.

In the Flask server 104, Flask Admin is used to manage user data files 102. The Bokeh server 108 may be configured to utilize a framework, such as Pandas, to process the input data using machine learning processes (e.g., Scikit-Learn) and data models. The Bokeh server 108 may generate and push interactive plots and help messages onto the front-end. A method for union and intersect of data selections is applied, as well as a pseudo Bayesian Information Criterion (pBIC) for automatic hyperparameter selection for t-SNE. To justify the correctness of pBIC method, Applicants designed and performed user studies to learn the users' preferences on the hyperparameter. The result shows pBIC method was found to work well in operation.

The system architecture is shown in FIG. 1. On the backend, there may be two servers or processors running simultaneously, and the servers may be remote from one another. In other embodiments, there may be only one server which handles various operations. The Flask server 104 can be configured to manage the home and the tutorial page on the front-end. The Flask server 104 also has an input file management module, which uses Flask Admin, for example, to manage data files that the users have uploaded to the server through [1].

The Bokeh server 108 is configured to handle computations in this system 100, and is configured to receive the data file from the file manager on the Flask server 104 that has been passed to the Bokeh server 108. The Bokeh server 108 for example, can apply a Pandas DataFrame (e.g., a Python DataFrame) to preprocess the data. The preprocessing aids in rectifying issues with missing values, setting appropriate types (including numeric, categorical, and datetime) to each column, and computing certain descriptive information about the input data (number of rows and columns, etc.). The processed data can then be cast into a Bokeh ColumnDataSource data structure, which can be a wrapper on the DataFrame, the server hosting the data to be plotted on different plots on the front-end 106 (which may further allow for manipulation by the provisioning and rendering of interactive interface elements). Next, data is transmitted to a machine learning unit. The system uses various three dimensionality reduction processes, namely, PCA, ICA, and t-SNE. PCA and ICA are fast to compute, and once they are completed, the reduction results are be recorded into the corresponding ColumnDataSource.

The generation of plots is done by the Bokeh server 108. The Bokeh server 108 generates, for example, three scatter plots for all three dimensionality reduction processes and a number of histograms showing the empirical distribution of each original column, and then pushes the processed data to the front-end 106. The ColumnDataSource can, in some embodiments, be a source of the data for all plots. The plots may be linked to one another (e.g., modifications on one lead to modifications on another).

When there are points selected from either of the plots or histograms, the ColumnDataSource will capture the selection, and the selected points can be highlighted on all of the plots as shown on front end 106. Meanwhile, categorical and datetime columns may, for example, not taken into account by those algorithms and may be visualized differently (e.g., using different colours or other visual distinguishing elements). Various filters and other types of visual effects may be overlaid or applied such that visualizations are modified.

The front-end is in HTML with CSS and Bootstrap™. Bokeh plots can be embedded in the HTML files by utilizing BokehJS. On the Bokeh server 108, once the plots are generated, the plots are converted into BokehJS and sent to the front-end 106. The widgets on the front-end 106, including tabs, buttons, dropdowns, etc., can be also generated with the Bokeh plots generation module. Once the user uses them from the front-end, the module may be configured to trigger callback functions that makes corresponding changes happen (e.g., dropdown to choose which categorical feature to visualize using colors). For the ease of use, some embodiments also include a help message engine on the backend, which generates corresponding help messages on the algorithm and the user operations in real-time.

Complex selections, including union and intersect from different plots, might not supported natively by Bokeh. To address this deficiency, another ColumnDataSource may be used to host the selected data points, such that it stores the past selections in memory, making it easier to find the union or intersect. With these functionality, the user can select data of interests from different plots or histograms in a complex manner.

The user can chain multiple union and/or intersect selections with irregular or rectangular boxes on different scatter plots or histograms, to explore the hidden patterns that possibly defined by the high-order and non-trivial interactions of different input features. These hidden patterns can be identified, for example, by pattern recognition that occurs when information is presented in different visual forms. Manipulations of the visualizations may aid in identifying, or exploring patterns.

In contrast, traditionally users wrote SQL queries that stack filtering or aggregation on each column, to explore and verify their hypothesis, which is hard to know a priori and take into account the high-order interactions of the data. Moreover, it takes time and effort to write and debug SQL programs in conventional approaches, whereas embodiments of the proposed system are fully automatic, saving the development effort and let the user to focus on the intrinsic patterns of the data, which can potentially improve business outcomes.

Two of the dimensionality reduction methods used in this system are fast to compute, whereas t-SNE, a powerful process, has a hyperparameter called "perplexity". In academia, it is not clear how to set this parameter automatically. Accordingly, some approaches include users doing trials with different perplexities and look at pictures that t-SNE produces to select the best one. This is typically very time-consuming. In the present system, an innovative approach called Pseudo Bayesian Information Criterion (pBIC) is implemented by the system as a process adapted to compute the best perplexity without human prior:

$$p^* = \mathrm{argmin}_p \, p \times \frac{\log N}{N} + \mathrm{kl\_div}(p) \quad (1)$$

where p is the perplexity, N is the number of data points, and kl_div(p) is the Kullback-Leibler divergence of the t-SNE with perplexity p on the given dataset.

In the machine learning module of the Bokeh server, 108, multiprocessing is provided to compute t-SNE with different perplexities scaling from 8 to the number of data points N, and then use Eq. (1) to select the best one to present on the front-end. On the front-end 106 there may be a slider provided for the user to adjust the value of perplexity manual, and the corresponding pictures will be extracted from the backend. In practical implementations on various datasets, the system was able to return results that tend to have clear cluster patterns, whereas when the perplexity is either too large or too small, the t-SNE results become quite blurred (e.g., difficult to distinguish).

Figure 2:
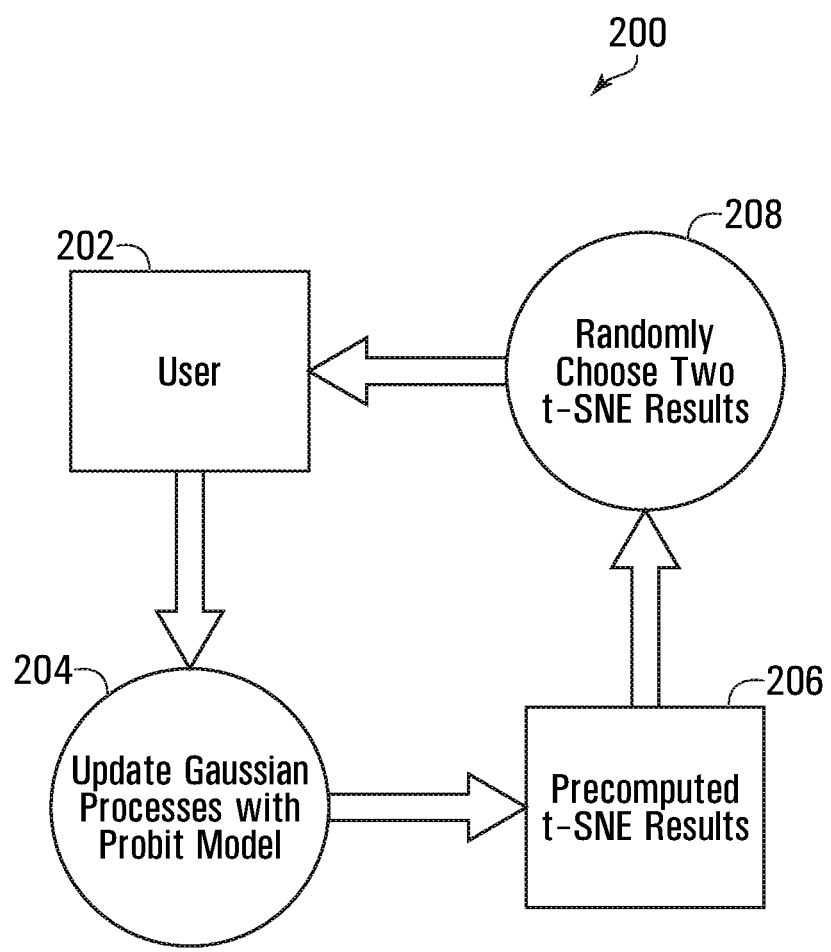
FIG. 2 is an illustration of a process flow including a human-in-the-loop model, according to some embodiments.

In order to verify the correctness of the pBIC in Eq. (1), Applicants developed a human-in-the-loop system (as shown in FIG. 2 in illustration 200) that can capture the users' preference on the t-SNE perplexity. The approach first includes precomputing t-SNE results with different perplexities, and then randomly sampling two of the results to present to the user. The user can consider and select which t-SNE pattern is better, or pass if not comparable (too similar).

The reason that the system collects users data by asking for their preferences is that psychology shows when making such preferences, behaviours tend to be less noisy than, for example, marking 1-10 in scale. Once the user has made a preference at 202, the preference is passed to a modified Gaussian Processes model 204 for update. Using a probit model, the system attempts to find the maximum preference score of perplexity from pairwise selections at 206. The system then prepares for the next loop by sampling another pair of t-SNE results to present to the user to query his/her preference at 208.

Two user experiments were conducted. For each experiment, the users can see class labels coloured. The experiment was designed because when the class labels are available the users tend to find a good t-SNE result easily. The first dataset is a synthetic with 1300 points coming from two Gaussian Blobs in a three-dimensional space. The pBIC in Eq. (1) returns a best perplexity of 77.47, whereas Gaussian Processes infer from more than 100 preferences of 8 people the optimal is 99.82. The second dataset is contains 10 classes of hand-writing digits with 1800 data points. The best perplexity from pBIC is 114.53, and Gaussian Processes returns an optimum of 77.84.

Given the fact that Applicants were searching for the best perplexity in a large interval of [8, 1300] for the first dataset and [8, 1800] for the second, Applicants' results indicated that pBIC returns fairly close results to the human selections. Furthermore, the Gaussian processes model is in a Bayesian framework, and the optimum is the best in the mean sense. In other words, the inferred optimum has some uncertainty. For example for the Gaussian blobs data with label colouring, the inferred optimum from Gaussian Processes at p=99.82 has a score in the 3-σ confidence bound between [0.97, 1.81], whereas at the pBIC optimum (p=114.53) the mean score is 1.25, which falls into this confidence bound. This is also true for the results from the first data set, where Gaussian Processes produce a confidence bound of score in [2.21, 2.86] at p=77.84) and the pBIC provides a perplexity of mean score 2.31 at p=77.84. Accordingly, the perplexity given by pBIC has a good chance to be actually optimal.

t-Distributed Stochastic Neighbor Embedding (t-SNE) (Maaten and Hinton, 2008) is arguably the most widely used nonlinear dimensionality for data visualization in machine learning and data science. Using t-SNE requires tuning some hyperparameters, notably the perplexity.

Although according to Maaten and Hinton (2008), t-SNE results are robust to the settings of perplexity, in practice, users would still have to interactively select perplexity by visually comparing results under multiple settings. The lack of automation in selecting this crucial hyperparameter poses difficulty for non-expert users who do not understand the inner working of the t-SNE algorithm. An approach is provided to automatically set perplexity, which requires no significant extra computation beyond runs of t-SNE optimization.

The proposed approach of some embodiments is based on an objective that is function of perplexity and resulting KL divergence of learned t-SNE. The system is configured to motivate the objective from the perspective of model selection and validation by demonstrating that its minimum agrees with human expert selection in empirical studies.

t-Distributed Stochastic Neighbor Embedding t-SNE tries to preserve local neighborhood structure from high dimensional space in low dimensional space by converting pairwise distances to pairwise joint distributions, and optimize low dimensional embeddings to match the high and low dimensional joint distributions. Specifically let $\{x_i\}_i^n=1$ be high dimensional data points, and $\{y_i\}_i^n=1$ the corresponding low dim embedding points, t-SNE defines joint distribution of point i; j as follows: The low dimensional joint distribution is $$q_{ij} = \frac{(1+\|y_i - y_j\|^2)^{-1}}{\sum_{s \neq t}(1+\|y_s - y_t\|^2)^{-1}} \quad (1)$$

and the high dimensional one is defined as symmetrized conditionals:

$$p_{ij} = (p_{i|j} + p_{j|i})/2n \quad (2)$$

where $$p_{i|j} = \frac{\exp(-\|x_i - x_j\|^2/2\sigma_j^2)}{\sum_{s \neq j} \exp(-\|x_s - x_j\|^2/2\sigma_j^2)} \quad (3)$$

Finally, the t-SNE optimizes $\{y_i\}_i$ to minimize the Kullback-Leibler divergence from low dimensional distribution Q to high dimensional P:

$$KL(P\|Q) = \sum_{i \neq j} p_{ij} \log \frac{p_{ij}}{q_{ij}} \quad (4)$$

Perplexity

In Eq. 3 contains $\sigma_i$ which defines the local scale around $\chi_j$. The value for $\sigma_j$ is not optimized or specified by hand individually, but rather found by bisection search to match a pre-specified perplexity value Perp.

The perplexity of $\rho_j$ is $\text{Perp}(p_j)=2^{H(P_j)}$, where $H(P_j)=-\Sigma_j p_{i|j} \log_2 p_{i|j}$, and $\sigma_j$ is selected so that $\text{Perp}(p_j)=\text{Perp}$. Perp is a hyperparameter of the t-SNE algorithm and is central to what structure t-SNE finds.

Larger Perp leads to larger $\sigma_j$ across the board, so that for each data point, more neighbours have significant $p_{i|j}$.

Automatic Selection of Perplexity

Figure 3A:
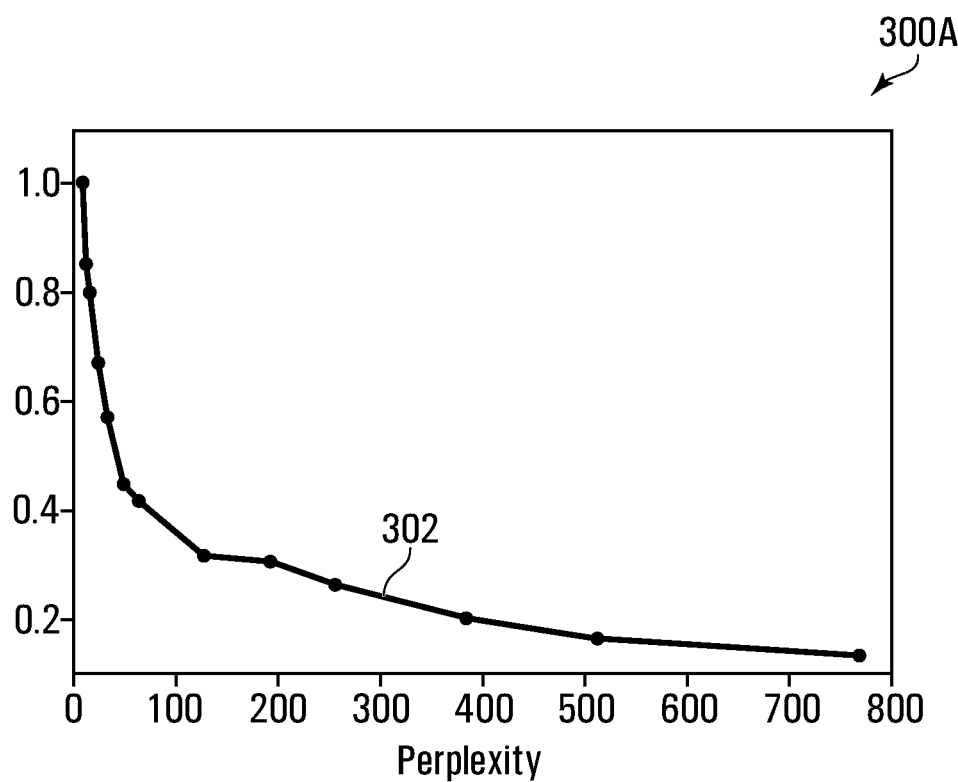
FIG. 3A and FIG. 3B are plots of KL divergence according to some embodiments.

The value of Kullback-Leibler (KL) divergence from different perplexities cannot be compared to assess the quality of embeddings, since the final KL divergence typically decreases as perplexity increases, as illustrated by graph 302 in plot 300A of FIG. 3A, so that model selection based on KL divergence alone will always lead to very large Perp.

However, the resulting embeddings from large Perp converge to a Gaussian-like blob and do not capture underlying pattern of the data. This suggests that trading off between the final KL divergence and a Perp could potentially lead to good embeddings. Based on this intuition, the system applies the following criteria:

$$S(\text{Perp}) = KL(P\|Q) + \log(n)\frac{\text{Perp}}{n} \quad (5)$$

Figure 3B:
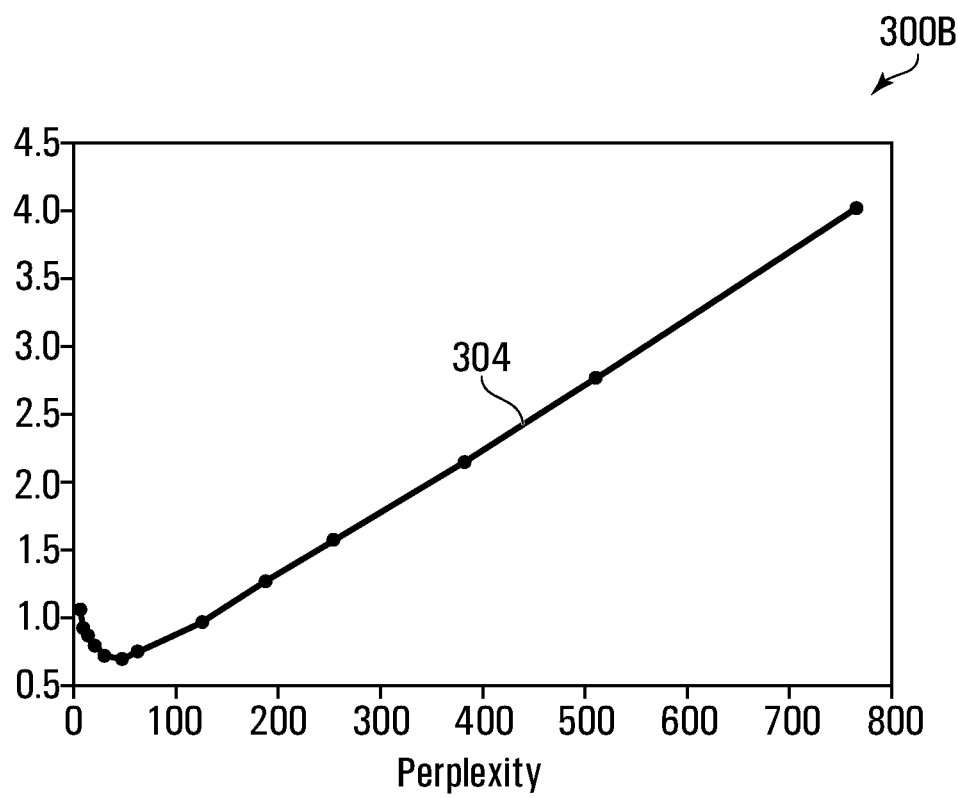

Corresponding to KL in FIG. 3A, S as function of Perp is FIG. 3B, as shown by graph 304 in plot 300B.

In later sections, examples will be provided demonstrating that Perp that minimizes S agrees with selection by human users across a number of datasets. Eq. 5 is motivated by relating the equation to Bayesian Information Criteria (BIC), and minimizing description length.

Interpretation as Reverse Complexity Tuning Via Pseudo BIC

Eq. 5 bears resemblance to Bayesian Information Criteria (BIC):

$$BIC = -2\log(\hat{L}) + \log(n)k \quad (6)$$

where the first term $-2 \log(\hat{L})$ is goodness-of-fit of the maximum-likelihood-estimated model ($\hat{L}$), while the second term $\log(n)k$ controls the complexity of the model by penalizing the number of free parameters k scaled by $\log(n)$. BIC is a large sample approximation to the negative marginal log likelihood of the model, and minimizing BIC automatically balances data-fit and model complexity.

The two terms in Eq. 5 are analogous, but the way the complexity changes is reversed: instead of increasing complexity of model to fit data better, increasing Perp reduces complexity of the pattern in data to be modelled, so that the same lower dimensional space can embed them better.

This is because when projecting from high dimensional to low dimensional spaces, there is not enough "room" in lower dimensional space to preserve all structure in high dimension, i.e., the "crowding problem". As Perp increases, differences of distances among points will become less and less significant with respect to the length scales of the kernel in P distribution, and P will tend toward a uniform distribution.

The forward form of KL objective function in Eq. 4 has large cost for under-estimating probability at some point, but not for over-estimating. In other words, if $p_{ij}$ is large and $q_{ij}$ is very small, KL divergence from that term is large, but in the opposite direction of small $p_{ij}$ and large $q_{ij}$, KL is not as affected. Increasing Perp leads to larger $\sigma_j$, and more uniform $p_{ij}$, so the easier is for the student-t distribution in low dimensional space to assign sufficient probability mass for all points.

In short, increases Perp relaxes the problem by reducing the amount of structure to be modelled so that less error is made as measured by $KL(P\|_Q)$, but one pays a price in the second term of Eq. 5. The end result is the same, a balance between data-fit and complexity of model relative to data complexity is achieved. For this reason, this description refers to S(Perp) in Eq. 5 as pseudo BIC in the experiments.

Minimizing Description Length

Minimum description length (Rissanen, 1978) is a way to realize the Occam's razor principle for model selection. It recognizes that a model that captures any regularity in data can compress the data accordingly, hence reduced description length of the data is the description length of model plus the description length of the data compressed under the model.

The $KL(P\|_Q)$ in Eq. 4 is the average number of extra bits required to encode samples from P using code optimized for Q. Since $p_{ii}$ is assumed to be 0 in tSNE, then $M=(n^2-n)/2$ is the number of unique pairwise probabilities. So M $KL(P_Q)$ is the total number of extra bits required. On the other hand, it takes −log (1/n) to encode the identity (index) of one data point, and each data point has Perp number of neighbors on average.

Because of the symmetrization of pairwise joint probability in tSNE, there are $$\frac{n}{2}(-\log(1/n))$$

Perp bits required to encode all neighbor identity information. Taking out the factor of M, Eq. 5 is arrived at.

Validation with Actual Human Prior on Perplexity

In order to validate the correctness of the proposed Psuedo BIC, a system is developed in some examples to capture human prior on t-SNE pictures resulted from different perplexities. Given a dataset, this system shows a pair of t-SNE pictures at a time, asks the user for preference (user can manipulate the pictures, in some embodiments), and continues for many iterations. Once the user preferences are collected, the approach applies Gaussian Processes (GP) with probit model to infer the preferred perplexity and compare with the Psuedo BIC results. Experiments have shown that Psuedo BIC consistently produces perplexities that are actually preferred by the users automatically.

Extraction of Human Prior Using Gaussian Processes with Probit Model

A naive way to extract human prior on the t-SNE visualizations from different perplexities is to iteratively create an instance with one perplexity and ask a human to rate it. This strategy suffers from the problem that human are not good at rating in a consistent manner, whereas judgements on preferences are more accurate. In some examples, the system employs a preference learning method using GP with probit model, which learns the latent function from pairwise preferences (Eric et al., 2008; Brochu et al., 2010). The latent function here maps perplexity to a human preference score, and the maximum of the it represents the most preferred perplexity from the human prior, which it is desirable to compare with the result from Psuedo BIC.

A system is built to collect human preferences on t-SNE pictures. The t-SNE results are precomputed from a linear grid of perplexities from 8 to the number of data samples, from which at each iteration two results are randomly sampled with replacement and presented.

Figure 4:
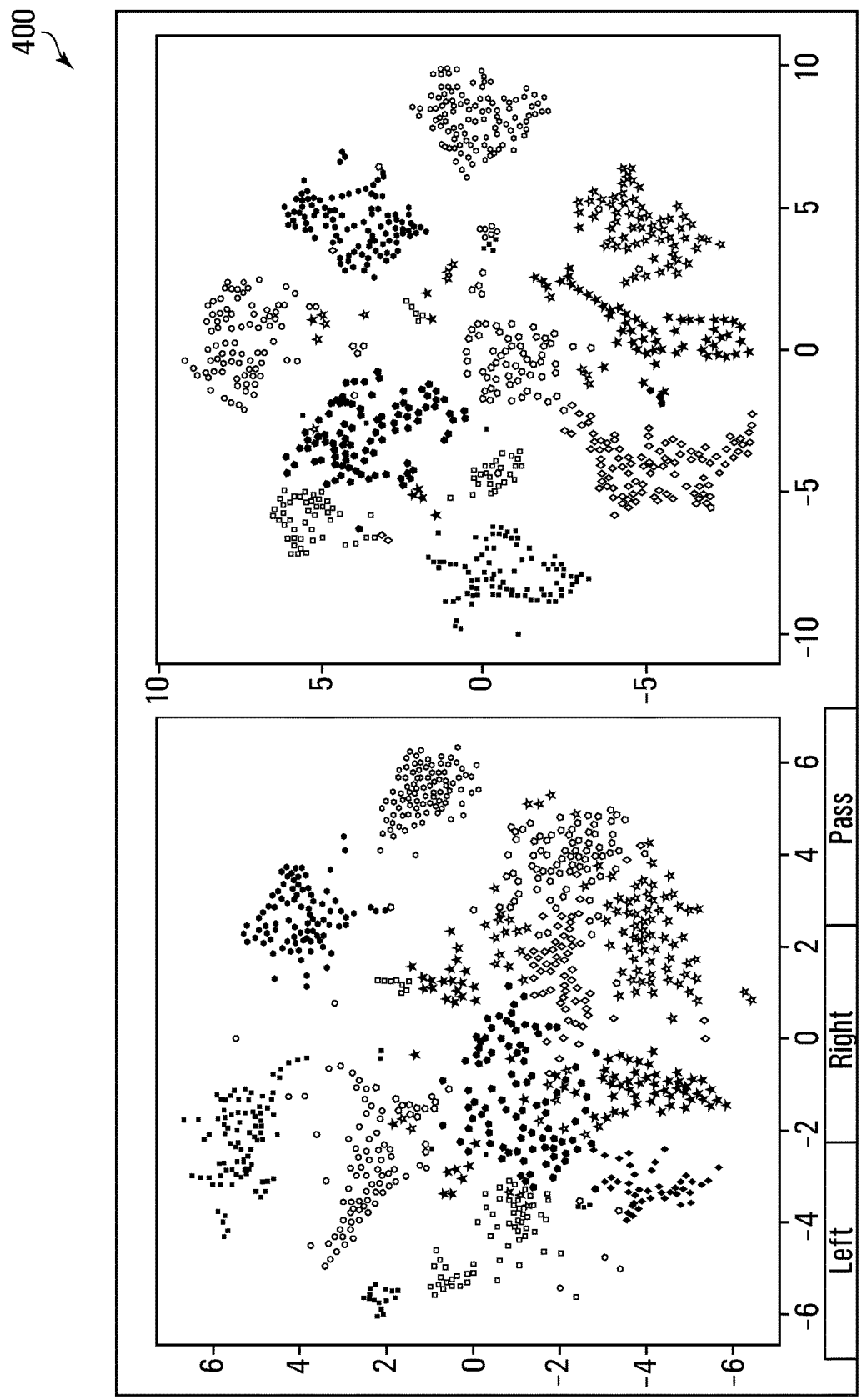
FIG. 4 is an example set of graphical user interfaces that may be generated and shown to a user, according to some embodiments.

FIG. 4 is an example set of graphical user interfaces 400 that may be generated and shown to a user, according to some embodiments. As shown in FIG. 4, at some iteration, two t-SNE pictures are presented to the user, who is asked to select which one has a better pattern, namely, which one has clearly distinct clusters (show, for example, in buttons LEFT, RIGHT, and PASS, which are interactive interface elements). If they are not comparable, the user just need to pass the current query (e.g., by selecting PASS).

Once the user preferences are collected, the system may be configured to use the GP with probit model to infer the most preferred perplexity. This model is originally developed for Bayesian Optimization. In theory, Bayesian Optimization can optimize a black-box function with minimum amount of queries by trading-off between exploration and exploitation using an acquisition function. The reason Applicants are not, in some examples, adopting such an active learning strategy is to reduce the waiting time of the users. The t-SNE method tends to be computationally expensive, and embedding it on-the-fly in a human-in-the-loop system turns out to cause the users to be bored and distracted. On the contrary, having the t-SNE pictures precomputed and collecting user results by randomly selecting pairs to compare in a fluid matter can keep the user stay focused, and thus more accurate results can be collected. The random selection strategy can also be interpreted as a Bayesian Optimization procedure that randomly explore the problem space.

User Experiments

When designing the experiments for the users, a first question to ask is can a user figure out the pattern from a t-SNE picture given a specific dataset? The answer is if there is no obvious intrinsic (local) structure within the data in the high-dimensional space, the user cannot make a judgement on which picture to choose either.

Figure 5:
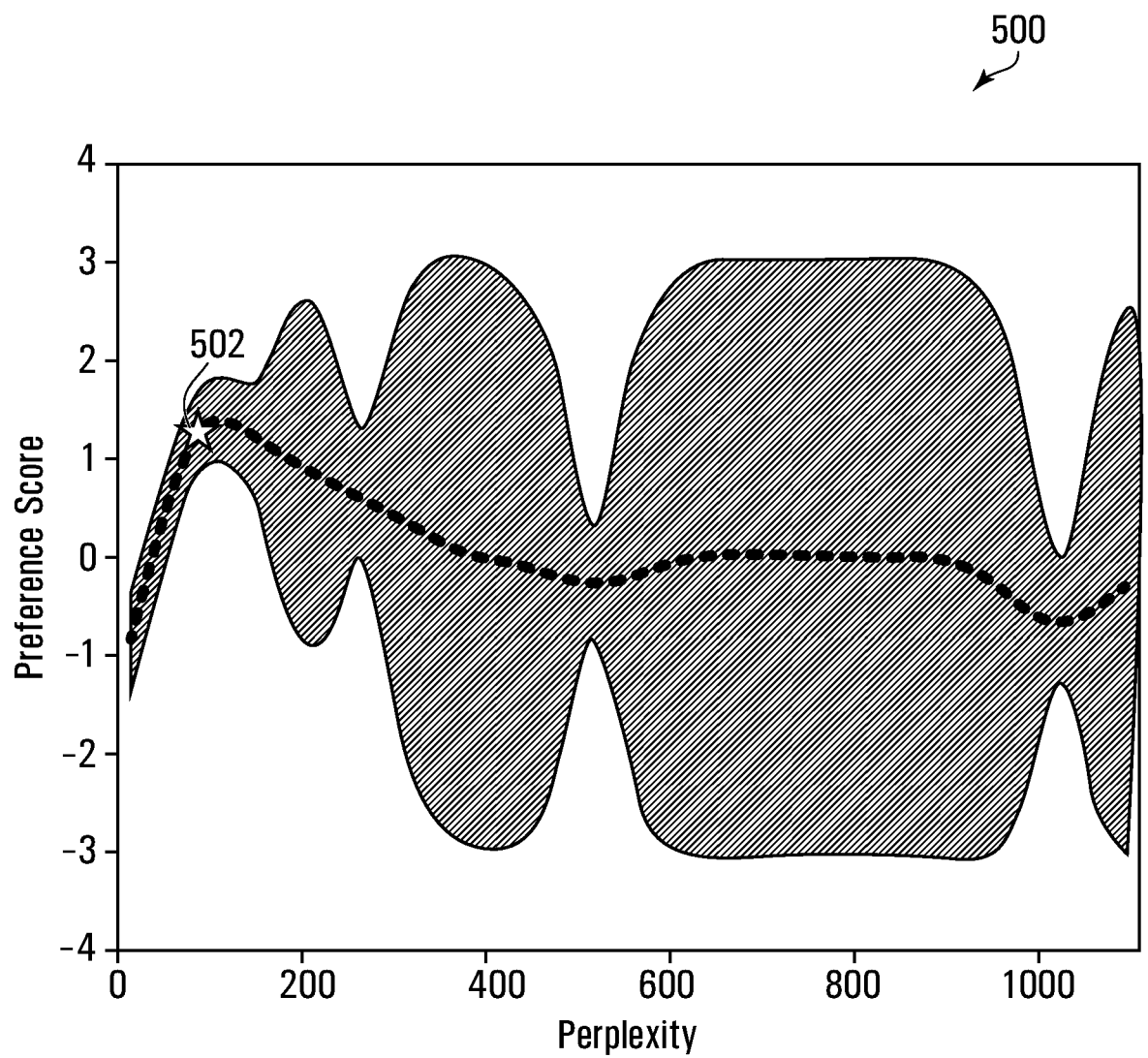
FIG. 5 is a plot of preference score against perplexity, for example Gaussian Blobs datasets, according to some embodiments.

For example, a dataset generated from one multivariate Gaussian does not have any useful local information, whereas two Gaussians will result in two distinct clusters in two or three dimension embeddings from t-SNE. Therefore, in some embodiments, the system is configured to select two datasets with clear intrinsic structures, and show in the interface the colored class labels (FIG. 5), to make it easier for the user to see how well does the algorithm work to retain the local structure in the original high-dimensional space. In FIG. 5, a Gaussian Processors Posterior 500 is shown from preference learning, the x-axis showing perplexity, and y-axis representing the perplexity preference score. A line is shown with the mean, and the 3-σ confidence bounds are shown. The star 502 shows the perplexity obtained from Pseudo BIC.

Figure 6:
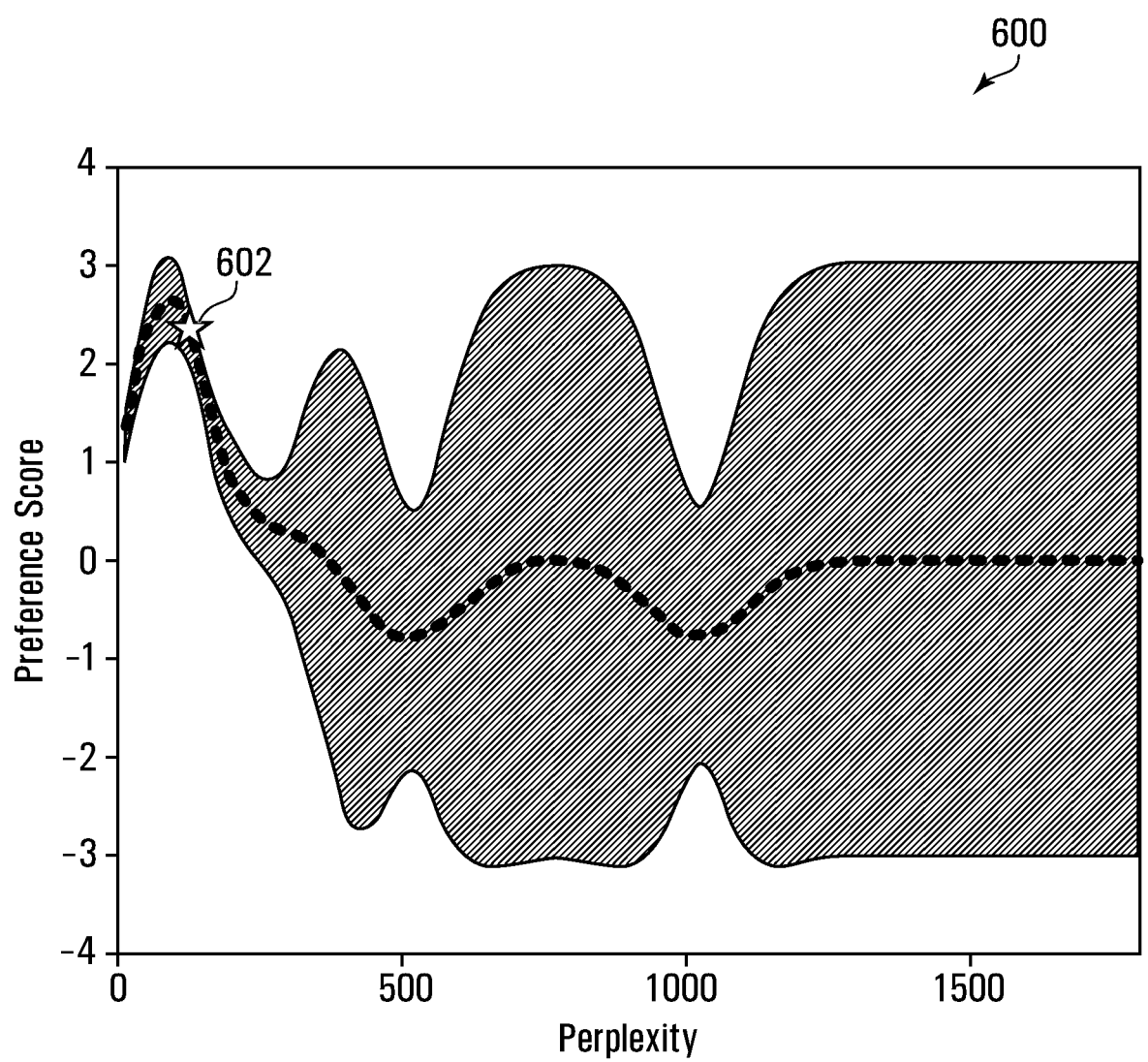
FIG. 6 is a plot of preference score against perplexity, for example Gaussian Blobs datasets, according to some embodiments, with a star showing the perplexity obtained from Pseudo BIC.

For the synthetic Gaussian blobs dataset, there are 1100 points generated from a 3-dimentional Gaussian mixture of two uneven Gaussians. Ideally, t-SNE will result in a pattern with two distinct clusters. In this case, Psuedo BIC computes an optimal perplexity of 77.47. The system also collects 115 preferences from 4 users, and the Gaussian Processes model generates a posterior in the diagram 600 of FIG. 6. The Pseudo BIC result is marked by a star 602, and it can be seen that they provides similar results. FIG. 6 shows a Gaussian Processors Posterior 600 from preference learning, the x-axis showing perplexity, and y-axis representing the perplexity preference score. A line is shown with the mean, and the 3-σ confidence bounds are shown. The star 502 shows the perplexity obtained from Pseudo BIC.

GP has a maximum posterior mean at 99.82, which is slightly off from the Psuedo BIC result. However, consider that there are some uncertainties about the maximum posterior mean. In fact, when the perplexity is 77.47, the Gaussian Processes model has mean 1.25, which falls into the confidence bound of where the perplexity is 99.82.

For the Digits data, there are 1797 data points with 10 distinct classes. 138 preferences are collected from 4 users, from which GP produces a posterior as in FIG. 6. A perplexity of 114.53 is reported from Psuedo BIC, whereas GP returns a maximum mean at p=80.11. Nevertheless, the mean prediction at p=114.94 still falls into the 3-σ confidence bound of GP at p=80.11.

In summary, demonstrated results indicate that Pseudo BIC returns a perplexity that is very close the one that preferred by human prior.

Figure 7:
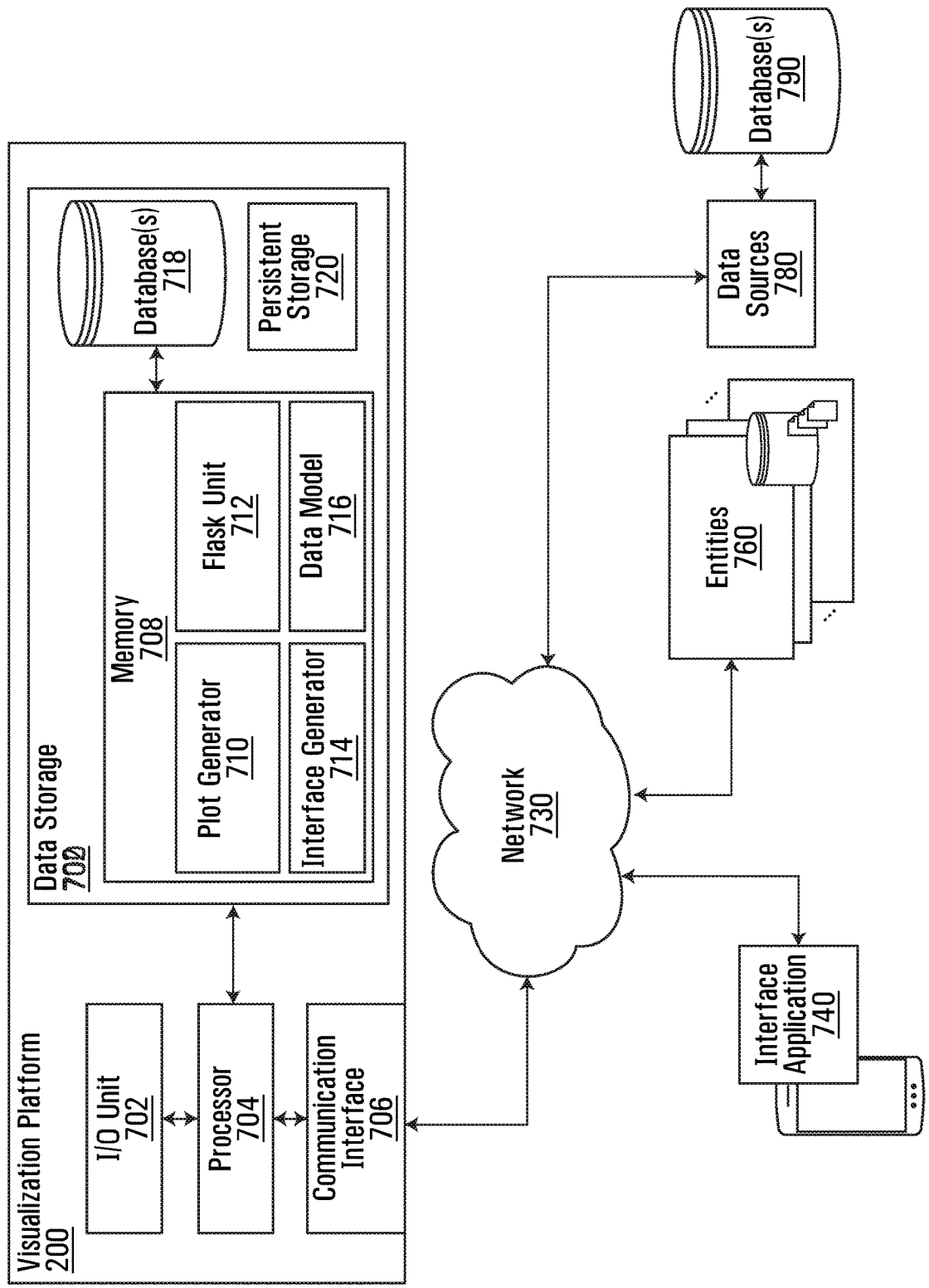
FIG. 7 an example system architecture diagram according to some embodiments.

FIG. 7 an example system architecture diagram of a visualization platform 200 according to some embodiments. The visualization platform 200 can implement aspects of the processes described herein.

The visualization platform 200 connects to interface application 740, entities 760, and data sources 780 (with databases 790) using network 730. Entities 760 can interact with the platform 200 to provide input data (e.g. user files) and receive output data. Network 730 (or multiple networks)

is capable of carrying data and can involve wired connections, wireless connections, or a combination thereof. Network 730 may involve different network communication technologies, standards and protocols, for example. The interface application 740 can be installed on a computing device to display an interface of visual elements that can represent dynamic visualizations that update in response to control commands at interface and interactive plots. The visual elements represent transformed raw data (e.g. user files) that can be generated using data models 716, flask unit 712, plot generator 710 and interface generators 714.

The visualization platform 200 can include an I/O Unit 702, a processor 704, communication interface 706, and data storage 700. The processor 704 can execute instructions in memory 708 to implement aspects of processes described herein. The processor 704 can execute instructions in memory 708 to configure data models 716, flask unit 712, plot generator 710 and interface generators 714, and other functions described herein. The visualization platform 200 has a processor 704 configured to collect data from different data sources 780 in a network 730. On the backend, there may be multiple processors 704 running simultaneously to implement the processes described.

The visualization platform 200 can generate one or more visualizations indicative of chaining of union or intersect of selections. The visualization platform 200 has a processor 704 configured to process machine readable instructions to receive user files from entities 760 and/or data sources 780 (coupled to databases 790) for storage in data storage 700. The visualization platform 200 can process the user files by applying a hyperparameter selection using data model 716. In some embodiments, the processor 704 is configured to process the user files using a pseudo Bayesian Information criterion of the data model 716 for automatic application of the hyperparameter selection. In some embodiments, the pseudo Bayesian information criterion is applied to automatically generate a best perplexity.

In some embodiments, the processor 704 is configured with the Flask unit 712 to preprocess the user files to correct missing values, sett appropriate types, and compute descriptive data. In some embodiments, the processor 704 is configured with the Flask unit 712 to process the user files by applying the automatic hyperparameter selection to reduce the dimensionality of the user files for generation of the interactive plot. That is, the user files are reduced in dimension for generation of the interactive plots by plot generator 710. The user files can be high dimensional data and the interactive plots can be two dimensional data or three dimensional data. The processor 704 is configured to the process the user files by applying the automatic hyperparameter selection to reduce the dimensionality of the user files from the high dimensional data to the two dimensional data or the three dimensional data. In some embodiments, the processor 704 is configured to process the user files to reduce the dimensionality of the user files for generation of the interactive plots using dimensionality reduction processes PCA, ICA and t-SNE, the interactive plots comprising reduction results from the dimensionality reduction processes.

The visualization platform 200 uses processor 704 configured with plot generator 710 to generate interactive plots using the processed user files and stores the interactive plots in databases 718. The interactive plots can be indicative of chaining of union or intersect of selections. In some embodiments, the plot generator 710 generates interactive plots that have a first scatter plot for the dimensionality reduction process PCA, a second scatter plot for the dimensionality reduction process ICA, and third scatter plot for the dimensionality reduction process t-SNE, and a plurality of histograms showing distributions for the dimensionality reduction processes.

The visualization platform 200 uses processor 704 configured with interface generator 714 to generate an interface with visual elements indicating the interactive plots. The interface has selectable indicia configured to be responsive to input to dynamically update the interactive plots. The input can be a selection of a data point or a subset of data points. In some embodiments, the data point represents an outlier data point or the subset of data points represents a cluster. The input can be a manipulation of the interactive plots. The input can be a movement of a slider that represents perplexity. In some embodiments, the interface has the selectable indicia configured to be responsive to input to trigger an operation for chaining of union or intersect selections of the selected data point or the subset of data points. In some embodiments, the selected data point or the subset of data points is from a first interactive plot which triggers generation of an automatic update of visual elements for other interactive plots at the interface. In some embodiments, the selectable indicia are logical anchor points of the visual elements that are indicative of an interactive ability to control visualization and the interface. Other examples are described herein. In some embodiments, the processor 704 is configured to store received input in a data storage as past selections for use in generating a union or intersect.

Responsive to the selectable indicia, the visualization platform 200 uses processor 704 configured with plot generator 710 to generate updated interactive plots and interface generator 714 to generate additional visual elements indicating the updated interactive plots. The visualization platform 200 uses processor 704 configured with interface generator 714 to update the interface with the additional visual elements indicating updated interactive plots. An interface application 740 (e.g. a user interface component of a computing device) is configured to display the interface with the visual elements representing the interactive plots and the additional visual elements indicating the updated interactive plots.

In some embodiments, the processor 704 is configured to process the user files using a pseudo Bayesian Information criterion of the data models 716 for the automatic hyperparameter selection. In some embodiments, the pseudo Bayesian information criterion is applied to automatically generate a best perplexity. In some embodiments, the pseudo Bayesian Information criterion is computed using p for the perplexity, N as a number of data points of the user files, and kl_div(p) is a Kullback-Leibler divergence of t-SNE with perplexity p on the user files. In some embodiments, the processor 704 is configured to implement machine learning (using rules of data model 716) to compute t-SNE with different perplexities to select the best perplexity. In some embodiments, the processor 704 is configured to implement an unsupervised learning process for the automatic hyperparameter selection.

In some embodiments, the interface generator 714 generates the selectable indicia with a slider to select a value for a perplexity for the pseudo Bayesian Information criterion to update the interactive plots.

In some embodiments, the plot generator 710 can generate the interactive plots as scatter plots linked to histograms of an original dimension of the user files to show a comparison between distributions of selected data point or the subset of data points.

The I/O unit 702 can enable the platform 200 to interconnect with one or more input devices, such as a keyboard, mouse, camera, touch screen and a microphone, and/or with one or more output devices such as a display screen and a speaker.

The processor 704 can be, for example, any type of general-purpose microprocessor or microcontroller, a digital signal processing (DSP) processor, an integrated circuit, a field programmable gate array (FPGA), a reconfigurable processor, or any combination thereof.

Memory 708 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 700 can include memory 708, databases 718 (e.g. graph database), and persistent storage 720.

The communication interface 706 can enable the platform 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The visualization platform 200 can be operable to register and authenticate users (using a login, unique identifier, and password for example) prior to providing access to applications, a local network, network resources, other networks and network security devices. The visualization platform 200 can connect to different machines or entities 760.

The data storage 700 may be configured to store information associated with or created by the platform 200. Storage 700 and/or persistent storage 720 may be provided using various types of storage technologies, such as solid state drives, hard disk drives, flash memory, and may be stored in various formats, such as relational databases, non-relational databases, flat files, spreadsheets, extended markup files, and so on.

Figure 8:
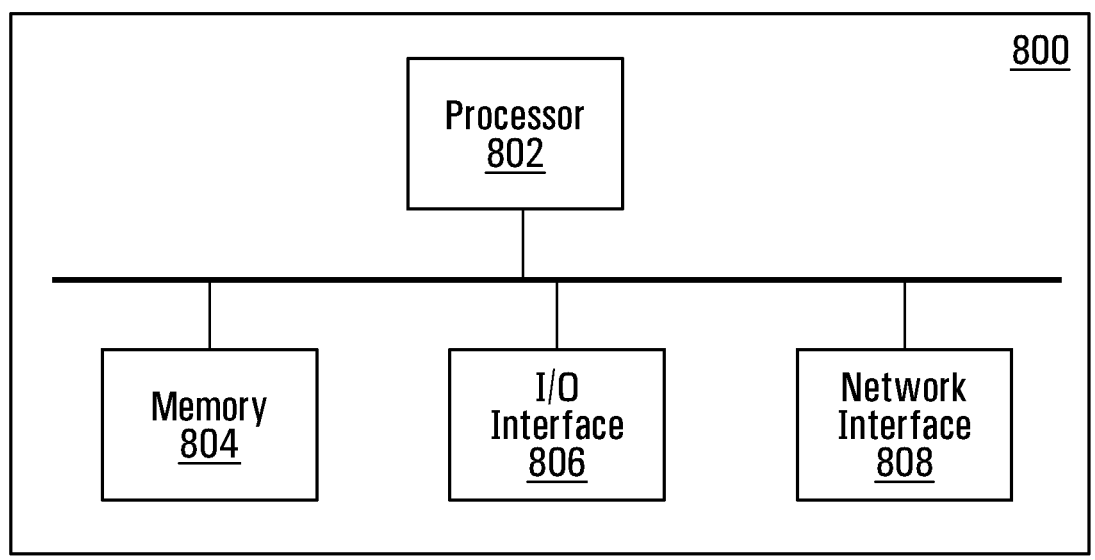
FIG. 8 is a diagram of an example computing device according to some embodiments.

FIG. 8 is a schematic diagram of computing device 800 which can implement aspects of different processes described herein. As depicted, computing device includes at least one processor 802, memory 804, at least one I/O interface 806, and at least one network interface 808.

Each processor 802 may be, for example, microprocessors or microcontrollers, a digital signal processing (DSP) processor, an integrated circuit, a field programmable gate array (FPGA), a reconfigurable processor, a programmable read-only memory (PROM), or combinations thereof. Processors are be used to implement the various logical and computing units of a system, as shown in FIGS. 1 and 7, for example, and different units may have different processors, or may be implemented using the same set of processors or the same processor.

Memory 804 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM). Memory 804 may be used to store visualizations, insights, data relationships, etc.

Each I/O interface 806 enables computing device 800 to interconnect with one or more input devices, such as a keyboard, mouse, camera, touch screen and a microphone, or with one or more output devices such as a display screen and a speaker. I/O interfaces 806 can include command line interfaces. These I/O interfaces 806 can be utilized to interact with the system, for example, to provide data inputs, preferences, etc.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including combinations of these. Network interfaces 808 are utilized, for example, to receive inputs, transmit or transform visualizations for remote devices, etc.

Embodiments of methods, systems, and apparatus are described through reference to the drawings.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A data visualization system for generating an interface with one or more visualizations of interactive plots of two-dimensional or three-dimensional data by reducing the dimensionality of high dimensional data, the interactive plots indicative of chaining of union or intersect of selections, the data visualization system comprising:
   a memory;
   a processor configured to process machine readable instructions to:
      receive user files comprising the high dimensional data;
      process the user files by applying an automatic hyperparameter selection to reduce the dimensionality of the user files from the high dimensional data to the two-dimensional or three-dimensional data of the interactive plots;
      generate the interactive plots using the processed user files, the interactive plots indicative of chaining of union or intersect of selections of the two-dimensional or three-dimensional data;
      store the interactive plots at the memory;
      generate the interface with visual elements indicating the interactive plots of the two-dimensional or three-dimensional data, the interface having selectable indicia configured to be responsive to input to select data points of the interactive plots;
      responsive to the selectable indicia, generate updated interactive plots based on the selected data points to indicate chaining of union or intersect of the selected data points;
      store the updated interactive plots;
      update the interface with additional visual elements indicating the updated interactive plots; and
   a user interface component configured to display the interface with the visual elements indicating the interactive plots and the additional visual elements indicating the updated interactive plots.

2. The system of claim 1, wherein the processor is configured to process the user files using a pseudo Bayesian Information criterion for the automatic hyperparameter selection.

3. The data visualization system of claim 2, wherein the pseudo Bayesian information criterion is applied to automatically generate a best perplexity.

4. The data visualization system of claim 3, wherein the pseudo Bayesian Information criterion is computed using:

$$p^* = \mathrm{argmin}_p \, p \times \frac{\log N}{N} + \mathrm{kl\_div}(p)$$

where p is the perplexity, N is a number of data points of the user files, and kl_div(p) is a Kullback-Leibler divergence of t-SNE with perplexity p on the user files.

5. The system of claim 3, wherein the processor is configured to implement machine learning to compute t-SNE with different perplexities to select the best perplexity.

6. The system of claim 2, wherein the interface instantiates handles or widgets for modifying the hyperparameter selection including a value for a perplexity for the pseudo Bayesian Information criterion to update the interactive plots.

7. The system of claim 1, wherein the processor is configured to implement an unsupervised learning process for the automatic hyperparameter selection.

8. The system of claim 1, wherein the processor is configured to process the user files by applying the automatic hyperparameter selection to reduce the dimensionality of the user files for generation of the interactive plot.

9. The system of claim 1, wherein the interactive plots represent scatter plots linked to histograms of an original dimension of the user files to show a comparison between distributions of selected data point or the subset of data points.

10. The system of claim 1, wherein the data point represents an outlier data point or the subset of data points represents a cluster.

11. The system of claim 1, wherein the interface has the selectable indicia configured to be responsive to input to trigger an operation for chaining of union or intersect selections of the selected data point or the subset of data points.

12. The system of claim 1, wherein the processor is configured to process the user files to reduce the dimensionality of the user files for generation of the interactive plots using dimensionality reduction processes principle component analysis (PCA), independent component analysis (ICA) and t-Distributed Stochastic Neighbour Embedding (t-SNE), the interactive plots comprising reduction results from the dimensionality reduction processes.

13. The system of claim 9, wherein the interactive plots comprise a first scatter plot for the dimensionality reduction process principle component analysis (PCA), a second scatter plot for the dimensionality reduction process independent component analysis (ICA), and third scatter plot for the dimensionality reduction process t-Distributed Stochastic Neighbour Embedding (t-SNE), and a plurality of histograms showing distributions for the dimensionality reduction processes.

14. The system of claim 1, wherein the processor is configured to store received input in a data storage as past selections for use in generating a union or intersect.

15. The system of claim 1, wherein the selected data point or the subset of data points is from a first interactive plot which triggers generation of an automatic update of visual elements for other interactive plots at the interface.

16. The system of claim 1, wherein the selectable indicia are logical anchor points of the visual elements that are indicative of an interactive ability to control visualization and the interface.

17. The system of claim 1, wherein the processor is configured to preprocess the user files to correct missing values, sett appropriate types, and compute descriptive data.

18. The system of claim 1, wherein the processor is configured to link a first interactive plot to a second interactive plot, wherein the selectable indicia of the interface are configured to be responsive to input to select the data points from the first interactive plot, wherein the processor is configured to generate the updated interactive plots by highlighting the data points in the second interactive plot.

19. A data visualization process for generating an interface with one or more visualizations of interactive plots of two-dimensional or three-dimensional data by reducing the dimensionality of high dimensional data, the interactive plots indicative of chaining of union or intersect of selections, the process comprising:
   at a processor,
      receiving user files comprising the high dimensional data;
      processing the user files by applying using a pseudo Bayesian Information criterion for automatic hyperparameter selection to reduce the dimensionality of the user files from the high dimensional data to the two-dimensional or three-dimensional data of the interactive plots, wherein the pseudo Bayesian information criterion is applied to automatically generate an optimal perplexity;

generating the interactive plots using the processed user files, the interactive plots indicative of chaining of union or intersect of selections of the two-dimensional or three-dimensional data;

storing the interactive plots at the memory;

generating the interface with visual elements indicating the interactive plots of the two-dimensional or three-dimensional data, the interface having selectable indicia configured to be responsive to input to select data points of the interactive plots;

responsive to the selectable indicia, generating updated interactive plots based on the selected data points to indicate chaining of union or intersect of the selected data points;

storing the updated interactive plots;

updating the interface with additional visual elements indicating the updated interactive plots; and at an a user interface component,
  displaying the interface with the visual elements indicating the interactive plots and dynamically updating the interface the additional visual elements indicating the updated interactive plots.

20. A non-transitory computer readable medium storing machine executable instructions to configure a processor for generating an interface with one or more visualizations of interactive plots of two-dimensional or three-dimensional data by reducing the dimensionality of high dimensional data, the interactive plots indicative of chaining of union or intersect of selections by:

receiving user files comprising the high dimensional data;

processing the user files by applying using a pseudo Bayesian Information criterion for automatic hyperparameter selection to reduce the dimensionality of the user files from the high dimensional data to the two-dimensional or three-dimensional data of the interactive plots, wherein the pseudo Bayesian information criterion is applied to automatically generate an optimal perplexity;

generating the interactive plots using the processed user files, the interactive plots indicative of chaining of union or intersect of selections of the two-dimensional or three-dimensional data;

storing the interactive plots at a memory;

generating the interface with visual elements indicating the interactive plots of the two-dimensional or three-dimensional data, the interface having selectable indicia configured to be responsive to input to data points of the interactive plots;

responsive to the selectable indicia, generating updated interactive plots based on the selected data points to indicate chaining of union or intersect of the selected data points;

storing the updated interactive plots;

updating the interface with additional visual elements indicating the updated interactive plots; and controlling the display of the interface, at a display device, with the visual elements indicating the interactive plots and dynamically updating the interface the additional visual elements indicating the updated interactive plots.

* * * * *